(No Model.)

R. M. HILL.
GEAR CUTTER SHAPING TOOL.

No. 316,784. Patented Apr. 28, 1885.

Witnesses —
Edward W. Thompson
Kirkley Hyde.

Inventor —
Robert M. Hill,
By Albert M. Moore,
His Attorney.

UNITED STATES PATENT OFFICE.

ROBERT M. HILL, OF LOWELL, MASSACHUSETTS.

GEAR-CUTTER SHAPING-TOOL.

SPECIFICATION forming part of Letters Patent No. 316,784, dated April 28, 1885.

Application filed April 7, 1884. (No model.)

*To all whom it may concern:*

Be it known that I, ROBERT M. HILL, a citizen of the United States, residing at Lowell. in the county of Middlesex and Commonwealth of Massachusetts, have invented certain new and useful Improvements in Metal - Shaping Tools, of which the following is a specification.

My invention relates to metal-shaping tools for cutting various forms upon revolving or reciprocating metallic blanks, and more particularly intended for forming milling-cutters; and it consists in the devices and combinations, hereinafter described and claimed.

Figure 1:
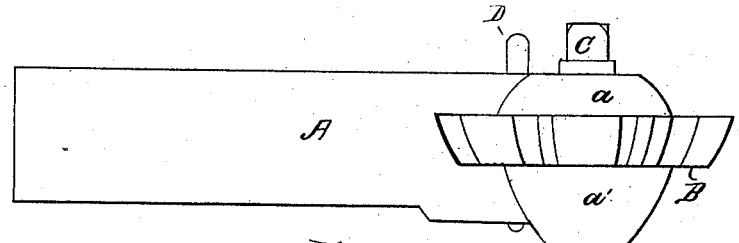
Figure 4:
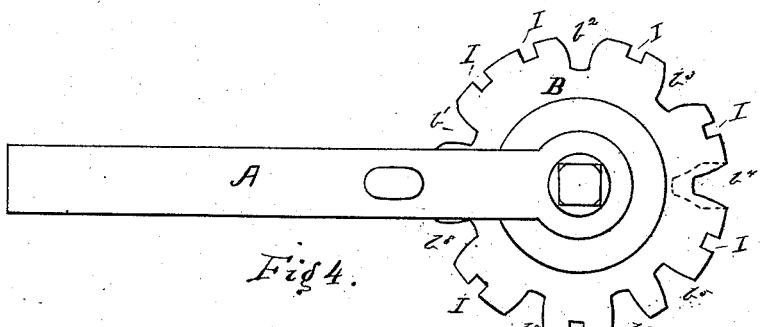
Figure 2:
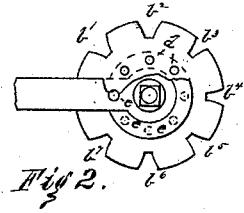
Figure 3:
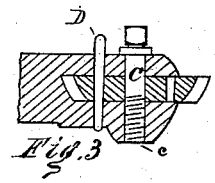
Figure 5:
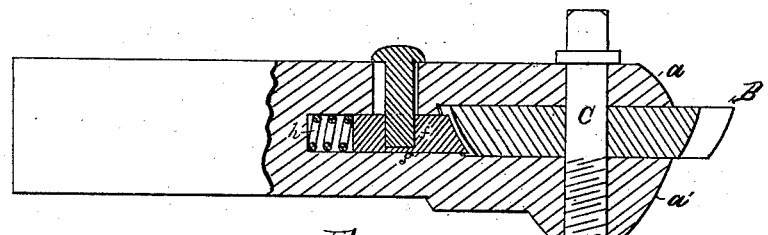

In the accompanying drawings, Figure 1 is a side view of the best form of my invention; Fig. 2, a top view of the same, the upper jaw of the clamp being broken away to show the holes in the plate, part of the shank being broken off. Fig. 3 is a longitudinal central vertical section of the best form of my invention, the shank being broken off. Fig. 4 is a top view, and Fig. 5 a longitudinal vertical central section, of a modification of my invention, a part of the shank in Fig. 5 being shown in side elevation.

A is a holder, preferably of wrought-iron, its shank being of a size and shape to be held in the tool-post of a lathe or plane, as turning and planing tools are commonly held. The holder is provided with clamping-jaws $a$ $a'$ to receive the shaper or former B. The former B is cut from a circular plate of steel, and is represented in Fig. 2 as provided with a series of shaping-notches, $b'$ $b^2$ $b^3$ $b^4$ $b^5$ $b^6$ $b^7$ $b^8$, eight in number, that being the number of gears in a set, and each of the shaping-notches is intended to form the periphery of a milling-cutter, as hereinafter described, although I do not, of course, intend to limit myself to any number of shaping-notches in a single former, as this is merely a matter of convenience. In the axis of the holder and the center of the former a hole is drilled at right angles to the former B through the holder-jaws $a$ $a'$ and said former, in which hole is placed a bolt, C, which is cylindrical, and provided at its lower end with a screw-thread, $c$, which takes into a corresponding thread in the lower jaw, $a'$, of said holder below said former, so that turning the bolt will clamp the jaws $a$ $a'$ firmly upon the former and prevent the former from rotating, and the end of the holder is enlarged above and below the former in order to present a greater surface to the former, and thereby to hold it more securely. When the bolt is loosened, the former may be rotated on said bolt to bring any of its shaping-notches into position for use. As it would not be safe to rely wholly upon the jaws of the holder to keep the former in position when in use, the former is provided with a series of slightly-tapering holes, $d$, one of said holes being opposite the middle of each shaping-notch and perpendicular to the top of said former. In the middle of the clamp are corresponding tapering holes, so placed that a tapering pin, D, may be inserted through the jaws and the former and hold the former in place; or the former may be prevented from turning by a sliding bolt, $f$, placed in a central cavity, $g$, in the holder, and forced by a spring, $h$, to engage with any one of a series of holding-notches, I, formed in the periphery of the former, each of said holding-notches being opposite one of the shaping-notches.

In use the shank of the holder is held in the tool-post of a lathe, and is thereby held against a revolving circular blank, the periphery of the blank being shaped by an appropriate shaping-notch of the former. Teeth are then formed in the blank by notching the periphery in the usual manner.

It will be seen that the former may be adjusted to cut any one of the shapes which it is adapted to cut without removing the holder from the tool-post of the lathe; also, that when the holder is inserted in the tool-post of a planer it may be used for chamfering or otherwise shaping the corners and edges of metal blanks.

In sharpening the former it is only necessary to grind its upper surface flat, because each shaping-notch is of the same shape from its upper to its lower surface—that is, if the former be divided at right angles to its axis into any number of thin plates, each such plate will have a series of shaping-notches, which will be equal in number, size, and shape to the series of shaping-notches in any other of said plates, although such plates will differ in diameter, because the opposite faces of the former differ in diameter, as shown in the side views.

I claim as my invention—

1. The combination of the holder adapted to be held in a tool-post and provided with jaws, and the former having a set of shaping-notches, and means of adjusting said former to present any desired one of said notches to the work, and means, substantially as described, of holding said former rigidly in said holder, as and for the purpose specified.

2. The combination of the holder provided with jaws having concentric tapering holes, the former adapted to be turned about its center in said jaws, and provided with a series of shaping-notches and with an equal number of tapering holes, each of said holes being opposite one of said notches, and each capable of being brought in line with the holes in said jaws, and the tapering pin, as and for the purpose specified.

3. The former provided with shaping-notches, each of said notches having every line where such notch is cut by a plane perpendicular to the axis of said former equal in length and curvature to every other such line, as and for the purpose specified.

ROBERT M. HILL.

Witnesses:
THOS. E. ANDREW,
EDWARD W. THOMPSON.